Figure 6:
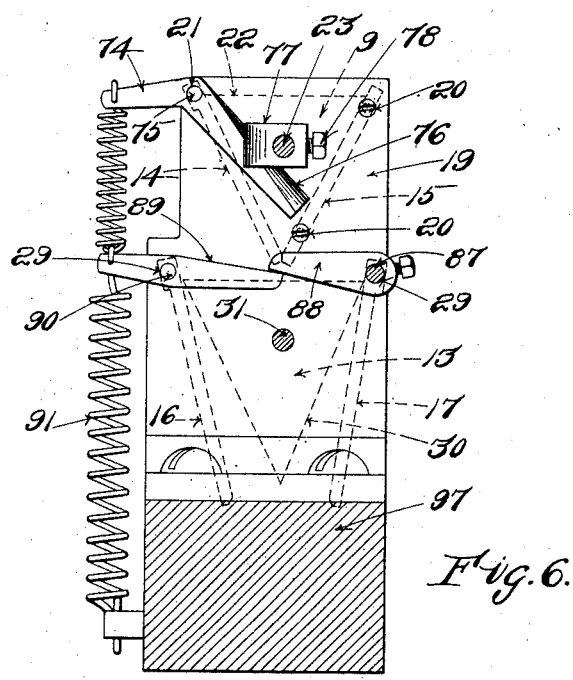

No. 882,879. PATENTED MAR. 24, 1908.
C. C. FREEMAN.
MACHINE FOR BOXING TOOTHPICKS.
APPLICATION FILED FEB. 13, 1907.
5 SHEETS—SHEET 1.
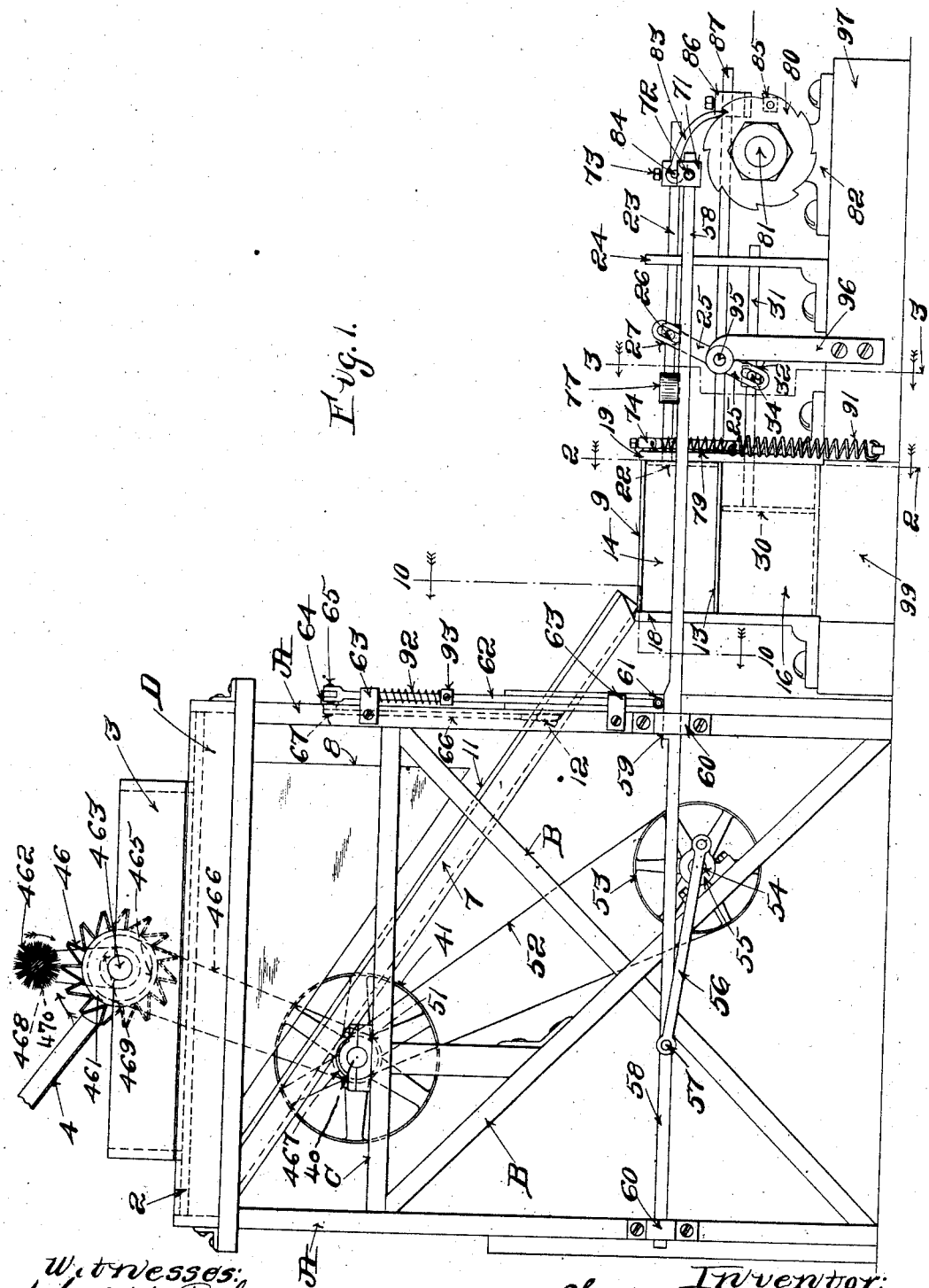
Witnesses:
John H. Parker
Josephine E. Long
Inventor:
Charles C. Freeman
by MacLeod Calver Copeland & Dike
Attorneys.

No. 882,879. PATENTED MAR. 24, 1908.
C. C. FREEMAN.
MACHINE FOR BOXING TOOTHPICKS.
APPLICATION FILED FEB. 13, 1907.
5 SHEETS—SHEET 2.
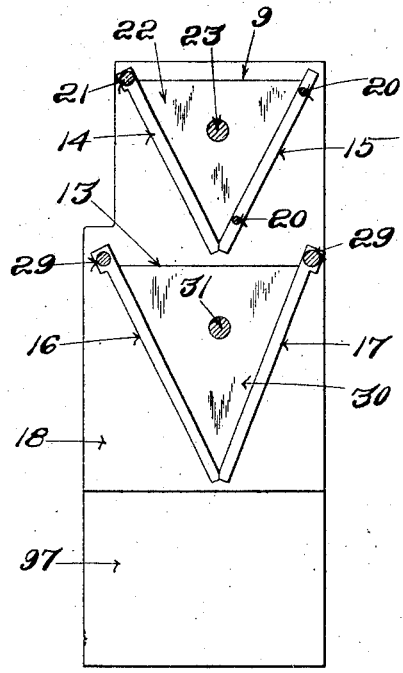
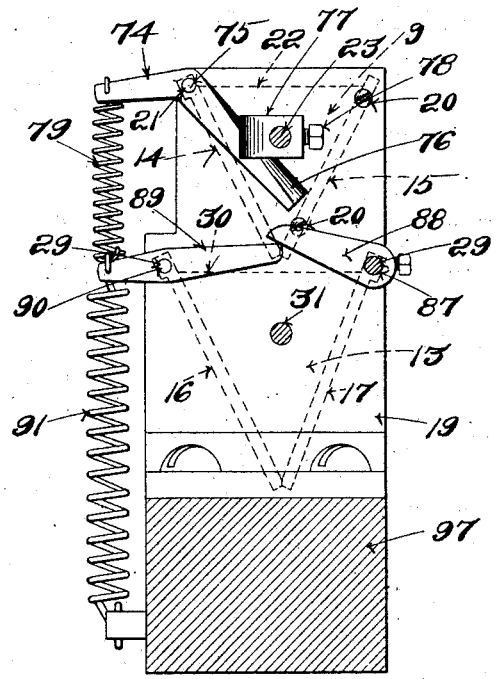
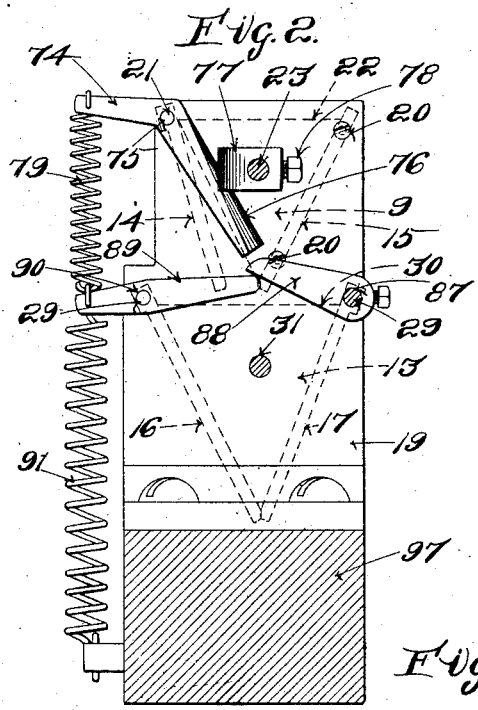
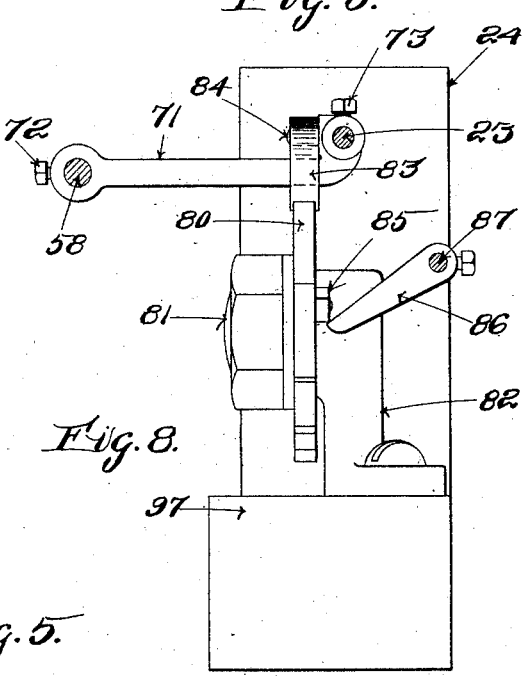
Witnesses:
John H. Parker
Josephine E. Long
Inventor:
Charles C. Freeman
by MacLeod Calver Copeland & Dike
Attorneys.

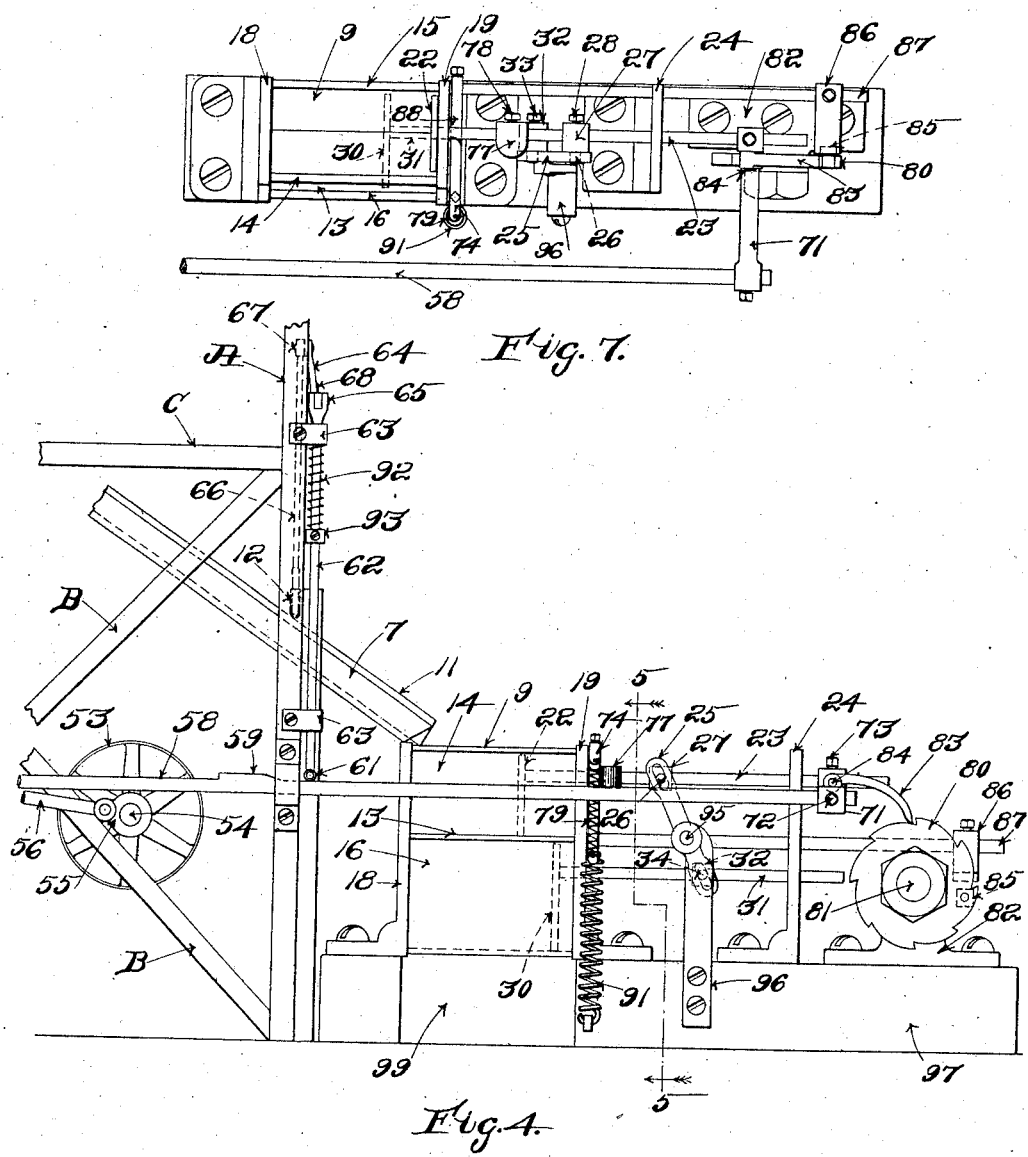

No. 882,879. PATENTED MAR. 24, 1908.
C. C. FREEMAN.
MACHINE FOR BOXING TOOTHPICKS.
APPLICATION FILED FEB. 13, 1907.

5 SHEETS—SHEET 4.

Witnesses:
John H. Parker
Josephine E. Long

Inventor:
Charles C. Freeman
by Macleod, Calver, Copeland & Dike
Attorneys.

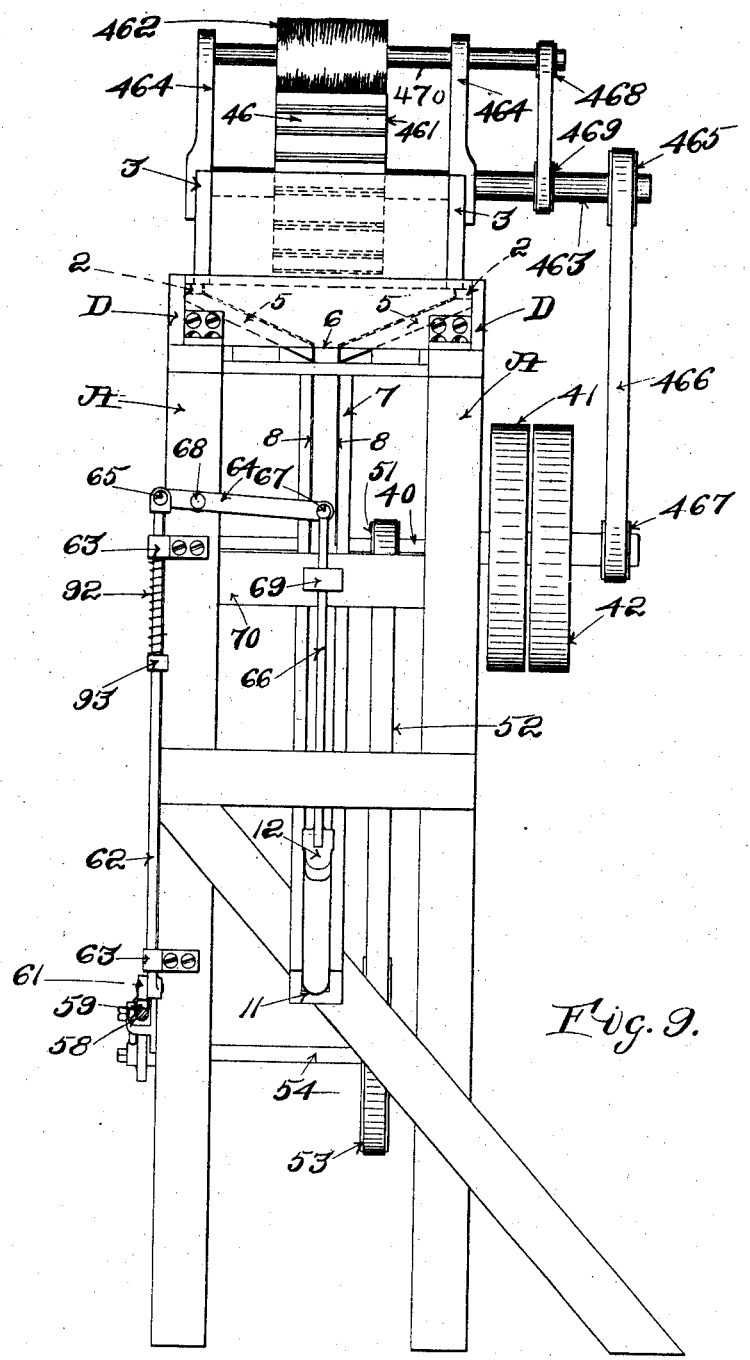

UNITED STATES PATENT OFFICE

CHARLES C. FREEMAN, OF DIXFIELD, MAINE.

MACHINE FOR BOXING TOOTHPICKS.

No. 882,879.  Specification of Letters Patent.  Patented March 24, 1908.

Application filed February 13, 1907. Serial No. 357,183.

*To all whom it may concern:*

Be it known that I, CHARLES C. FREEMAN, citizen of the United States, residing at Dixfield, in the county of Oxford, State of Maine, have invented a certain new and useful Improvement in Machines for Boxing Toothpicks, of which the following is a specification, reference being had therein to the accompanying drawings.

My invention has for its object to provide an improved machine for boxing wooden tooth picks, or similar articles.

Wooden tooth picks are now usually marketed in small paper boxes containing about a thousand picks. The picks are placed in these boxes by hand and the cost of filling the boxes is a considerable item.

My improved machine is adapted to receive the picks after they are finished, arrange them properly parallel with each other and deliver them into the boxes to be filled, the machine being so arranged that it may be set to deliver to each box any number of picks required.

The invention consists of certain coöperating mechanisms which are fully set forth in the following description and shown in the accompanying drawings, and the novel features thereof are pointed out and clearly defined in the claims at the close of this specification.

In the drawings,—Figure 1 is a side elevation of a machine embodying my invention. Fig. 2 is a section on line 2—2 of Fig. 1. Fig. 3 is a section on line 3—3 of Fig. 1. Fig. 4 is a side elevation of the right hand portion of the device shown Fig. 1, and showing the operative parts in different position from that shown Fig. 1. Fig. 5 is a section on line 5—5 of Fig. 4. Fig. 6 is a similar section to that shown Fig. 5, but showing the parts in another position from that shown Fig. 5. Fig. 7 is a plan view of the right hand end of the machine as shown Figs. 1 and 4. Fig. 8 is an end view taken from the right of Fig. 4. Fig. 9 is an elevation from the right of Fig. 1 of that part of the machine shown in Fig. 1 which is at the left of the line 10—10 on said Fig. 1.

Referring to the drawings,—A shows an upright frame work having suitable braces B and cross-pieces C to stiffen and strengthen it. This frame work may be of any desired form or construction so long as it is adapted to support in proper relation to each other the distributing wheel, the chute and the operating mechanism hereinafter to be described.

After being tumbled in the well known manner the picks are discharged from an opening in the discharge end of the tumbling apparatus and drop onto a chute 4 down which they slide into the buckets 46 formed on the periphery of the distributing wheel 461. A rotating brush 462 may be employed to prevent a greater number of picks than is sufficient to fill a bucket even full being carried forward by the wheel. As the distributing wheel 461 rotates at a relatively high speed, the buckets 46 thereof will contain only a few picks at a time, which is desirable since in this way the picks are better distributed and are less likely to become bunched and thus clog the apparatus. The rotation of the wheel 461 past the center permits the buckets 46 to discharge the picks which are contained therein by gravity and they drop either into the slot 6 hereinafter described, or onto the inclined bottom pieces 5, 5, of the box 3. The distributing wheel 461 is mounted on a shaft 463 journaled in side pieces of the box 3. The brush 462 is also mounted on a shaft 470 which is journaled in uprights 464, see Fig. 9, which are supported by the sides 3. The projecting end of the shaft 463 is provided with a pulley 465 which is driven by the belt 466 from the pulley 467 on the end of the main shaft 40. The said main shaft and the mechanism connected therewith for operating the other moving parts of the machine will be hereinafter described. For the purpose of driving the rotating shaft 470, its shaft is provided with a pulley 468 which is belted to a pulley 469 on the shaft 463 as will be clear from Fig. 9.

At the top of the frame work A is located two horizontal supports D, Figs. 1 and 9, upon which is supported and secured the box shaped top 3, the bottom of which consists of two inclined side pieces 5, see Fig. 9, having an opening between them at their lower or proximate ends, said opening being shown at 6. As the picks fall from the distributing wheel, they either fall into the opening 6 or if they fall at either side thereof are received by the inclined sides 5 and slide into the opening 6. Directly beneath the opening 6 is an inclined trough shaped chute 7, see Fig. 1, and on either side of said opening and beneath the same is a vertical curtain 8 which may be of leather or other flexible material, or which may be of rigid material such as wood. The curtains 8 simply serve to guide the falling picks and insure their dropping into the chute 7. The chute 7 is suitably supported in the frame A and is inclined, as shown Fig. 1, the upper end of the chute being nearly on the level with the bottom of the hopper and the lower end thereof projecting downwardly and discharging into a receptacle 9.

The chute 7 is formed from two side pieces and a bottom piece preferably of wood in the usual way, and it is provided inside with what may be termed a lining 11 which is preferably of sheet metal having a smooth surface so that the picks may slide down the same. What I have termed the "lining" is really the chute proper, and the outside wooden portion comprising two sides and a bottom is a casing or support therefor. The bottom of the metallic lining or chute 11 is rounded, that is the said metallic chute 11 is U-shaped in cross-section. When the picks fall into this chute, they assume a position in which their long axes are lengthwise of the chute and the mass of picks lie parallel with each other in the bottom of the chute and in this position slide downwardly into the receptacle 9.

For the purpose of controlling the number of picks which may be discharged into the receptacle 9 a vertically movable stop 12 is provided and which by means of suitable operating mechanism may be moved downwardly to close the chute and thus prevent picks from passing down the same or it may be opened to allow the picks to freely pass downward to the receptacle 9. The mechanism for operating this stop will be hereinafter more fully described.

From the chute 11 the picks pass as heretofore stated into a receptacle 9 and from this receptacle 9 they are dropped by gravity into a receptacle 13 directly below the receptacle 9. The receptacles 9 and 13 are each somewhat longer than the length of the longest pick which the machine is designed to handle. The boxes to be filled are placed by the attendant below the receptacle 13 in the space designated 99, see Fig. 1, and when a sufficient number of picks has been accumulated in the receptacle 13 to fill the box, the said receptacle 13 opens and the picks are discharged by gravity into the box; the attendant then removes the box, replacing it by an empty one, closes and secures the box removed and the latter is ready for shipment.

The receptacle 9 is so arranged as to discharge into the receptacle 13 several times, preferably five or six times before the receptacle 13 discharges into the box; that is to say the receptacle 9 discharges five or six times while the receptacle 13 is discharging once. This I find advantageous in that it enables a relatively small number of picks at a time to be handled in the receptacle 9 and discharged into the receptacle 13.

The operation of the receptacles 9 and 13 will be understood by reference to the drawings, more particularly Figs. 1 and 2. Both these receptacles 9 and 13 are V-shaped in cross-section and are formed substantially of vertical end pieces 18 and 19 between which are placed inclined sides, which in the case of the upper receptacle 9 I have designated 14 and 15, and in the case of the lower receptacle 13 I have designated 16 and 17, see Fig. 2. The inclined side 15 of the receptacle 9 is secured in place between the end pieces 18 and 19 by suitable screws, such for example as are shown at 20, Figs. 3 and 5. The side piece 14 which forms the other side of the receptacle 9 is pivoted, as indicated at 21 to the end pieces 18 and 19, thereby permitting the said side piece 14 to be swung away from the side piece 15, thereby opening the receptacle 9 at the bottom thereof and permitting the contents to be discharged into the receptacle 13. The receptacle 9 is provided with a follower 22, which is of a shape corresponding with the cross-section or V-shape of the receptacle and which fits inside the receptacle as shown Fig. 2. This follower is actuated by means of a slide rod 23, see Figs. 1 and 7. The said rod 23 is guided in its movement by passing through a hole in the end piece 19, and a corresponding hole in a vertical supporting piece 24, and is actuated by means of the slotted lever 25, the upper end of which engages a pin 26 in a sleeve or boss 27 which is secured by means of a set screw 28 in the usual manner to the slide rod 23. As the lever 25 is reciprocated, it will be clear that the slide rod 23 and the follower 22 will also be caused to reciprocate. The purpose of the follower 22 is to push the picks which are discharged down the chute 11 into the receptacle 9 to one end of the receptacle 9 and to place them in the end of said receptacle in an even pile. The movement of the follower 22 is such that when it is at its extreme movement in the receptacle 9, the space between the follower and the opposite end of the receptacle will be substantially equal to the length of the tooth pick therein. In this way the picks are insured against being damaged by the follower. The follower 22 moves within the receptacle 9 after each successive discharge of picks into the receptacle. At the end of its movement toward the opposite end of the receptacle, the swinging wall 14 of the receptacle is moved, thereby opening the receptacle and permitting the picks therein and which have been evened up by the movement of the follower 22 to drop by gravity into the receptacle 13. The receptacle 13 is of somewhat larger capacity than the receptacle 9 and is formed in substantially the same way except that both of its inclined sides 16 and 17, see Fig. 2, are pivoted as indicated at 29 between the end pieces 18 and 19. The receptacle 13 is also provided with a follower 30 which is actuated by a slide rod 31 which is mounted in the end piece 19 and vertical supporting piece 24 in substantially the same way as is the slide rod 23 above referred to. The slide rod 31 is also provided with a sleeve 32, see Fig. 7, secured in place by means of a set screw 33 and having a pin 34 which coöperates with a slot in the lower end of the lever 25. By this means the slide rod 31 and follower 30 are actuated, the said follower 30 moving within the receptacle 13 and performing therein the same function of evening up the picks which are in the said receptacle as is performed by the follower 22 in the receptacle 9.

After several discharges from the receptacle 9 into the receptacle 13 and the accumulation in the latter of picks to the desired number, the inclined sides 16 and 17 of the said receptacle are both swung outwardly away from each other, thereby permitting the picks within the receptacle to drop quickly into the box, which is located directly beneath. The number of picks which are accumulated in the receptacle 13 between successive discharges therefrom are not accurately numbered, but are in practice found to be sufficient to fill a box of the usual size in which the picks are packed, and this number can be varied by properly timing and adjusting the stop 12 which operates within the chute 11. The paper boxes, however, are of a size to hold, when evenly filled to the top, the number of tooth picks which it is designed to put in them, and the filling of the boxes evenly to the top insures to each box the number of picks which it is designed to place therein.

For the purpose of vertically moving the stop in the chute, of reciprocating the followers 22 and 30 in the receptacles 9 and 13, and of opening the receptacles 9 and 13 at stated times, the following mechanism is provided: A main shaft 40 is mounted in the supporting frame in any suitable manner. The said shaft is provided outside the frame with fast and loose pulleys 41 and 42 by means of which the said shaft may be driven. On the shaft 40 is secured a pulley 51. By means of a belt 52 which passes around the pulley 51 and around the pulley 53 which is fast on the shaft 54, the said shaft 54 is driven. The shaft 54 is also provided at one end, as shown, with a crank 55 and a pitman 56 is connected at one end with the said crank and at the other with a pin 57 on the slide rod 58. The rod 58 is mounted in ways or brackets 60 on the uprights of the frame A and is thereby permitted to be reciprocated as the shaft 54 revolves. On the upper face of the said rod 58 is a cam 59. This cam is formed by means of a projection on the rod, as shown Fig. 1, the end of said projection being inclined and the top thereof being substantially flat or horizontal. The said cam coöperates with a roll 61 on the lower end of a vertically movable rod 62 which slides in brackets 63 which are fast on the upright of the frame A.

The upper end of the rod 62 is pivoted to a lever 64 at 65, see Fig. 9, the other end of said lever being pivoted to a vertical slide rod 66 at 67. The lever 64 is pivoted to the frame 68. The slide rod 66 moves in a guide or way 69 on the cross piece 70 on the frame. The lower end of the rod 66 is fast to the stop 12 which fits within the chute 11 when the said stop is in its downward position and thereby serves to prevent the passage of picks down the said chute. When the cam 59 is in position as shown Fig. 1 with the cam roll 61 on the highest part of said cam, the said stop 12 will be in its lowermost position and will close the chute. When the cam 59 is moved out from under the roll 61, the coiled spring 92 operates to force the rod 62 downwardly and reverse the movement which the parts were given by the cam 59. The coiled spring 92 encircles the rod 62 and is located between a collar 93 secured to the rod 62 and the upper bracket or guide way 63.

The slide rod 58 projects forward, as will be clear from Fig. 1, and at its forward end there is rigidly secured to it a cross connecting piece 71 by means of a set screw 72. The other end of the connecting piece 71 is fast by means of the set screw 73 to the slide rod 23, see Fig. 8. It will be clear, therefore, that as the slide rod 58 is reciprocated, the slide rod 23 which operates the follower 22 will be correspondingly reciprocated, and the slide rod 31 which operates the follower will likewise be reciprocated by reason of the slotted lever 25 which has been heretofore described as connected at its upper end with the slide rod 23 and at its lower end with the slide rod 31. The said lever 25 merely serves to transmit the movement of the rod 23 to the rod 31 but the latter will at a given movement be moving in an opposite direction from the former. The lever 25 is pivoted at 95 to the upper end of the upright 96 which is fast to the bed 97 of the machine, as will be clear from Fig. 1.

For the purpose of moving the inclined side 14 of the receptacle 9 in order to open the upper receptacle, the motion of this same slide rod 23 is also utilized, said side 14 is swung by means of a bent lever 74, see Fig. 3, which is fast to the pivot or trunnion 75 of the inclined side piece 14 so that when said lever is moved or swung on its pivot, the said piece 14 will also be swung and the receptacle 9 be opened. To move or swing the lever 74, I provide the downwardly extending end of the lever with an inclined face 76 and I provide a tappet 77 which is firmly secured on the slide rod 23 by means of a set screw 78, as will be clear from Fig. 3. As the slide rod 23 is moved to push the follower 22 toward the center of the receptacle 9, that is toward the left in Fig. 1, and just before the said follower 22 reaches the extreme of its movement toward the center of the said receptacle, the tappet 77 makes contact with the inclined face 76 of the lever 74 and the lever is swung downwardly, the outer or free end of the lever being raised against the pressure of the spiral spring 79. As soon as the rod 23 starts to move in the opposite direction, it frees the tappet 77 from the said lever 74 and the spring 79 immediately acts to throw the lever 74 back to its normal position and at the same time to close the receptacle 9 by swinging the side piece 14 thereof into its normal or closed position.

For the purpose of opening the lower receptacle 13 to permit the picks therein to be discharged into the box which is to be filled, I provide a ratchet wheel 80 which is mounted upon a horizontal stud 81 projecting from a fixed vertical support 82. The ratchet wheel 80 is actuated by means of a dog or pawl 83 which is held by gravity against the periphery of the said ratchet wheel, and which is pivoted at its upper end at 84 to a part of the cross-connection 71, as will be clear from Fig. 8. As the slide 58 is reciprocated, the dog 83 coöperates with succeeding teeth of the ratchet 80 and the ratchet is given an intermittent movement of rotation. On the face of the ratchet 80 I provide a tappet 85, see Fig. 8. A pawl 86 which is secured by means of a set screw on the rock shaft 87 projects into the path of movement of the tappet 85 and as the tappet moves through one portion of its path, it makes contact with the pawl or dog 86 as is shown Fig. 8, swinging the latter downwardly and thus rocking the shaft 87. Toward the opposite end of the shaft 87 is a dog 88, see Fig. 3, the inner end of which projects over the inner end of the lever 89 which is fast on the trunnion 90 of the side piece 16 of the lower receptacle 13. The rock shaft 87 is also the trunnion upon which the swinging side piece 17 of the lower receptacle 13 swings. The downward movement of the dog 86 and consequent rocking of the shaft 87 causes a similar downward movement of the dog 88 and the swinging back of the side piece 17 of the lower receptacle 13. As the inner end of the dog 88 is in contact with the corresponding inner end of the lever 89, the latter is also swung downwardly opening or swinging back the inclined side piece 16 of the receptacle 13. The downward swinging movement of the inner end of the lever 89 causes an upward movement of the outer end thereof against the tension of the coiled spring 91. As soon as the tappet 85 has passed the dog 86, the spring 91 immediately acts to return the parts to their normal position and to close the receptacle 13, as will be clear.

The operation of the machine is as follows: The picks, after they are finished and as they come from the tumbling machine, drop onto the chute 4 down which they slide into the buckets of the distributing wheel 461, by which they are dropped in a somewhat scattered manner into the box 3 and fall into the chute 11, down which they slide endwise to the stop 12 if the latter be closed, or if the latter be raised, out of the chute on into the upper receptacle 9. The opening and closing of the stop 12 permits only a relatively small number of picks to be passed into the receptacle 9 at one time. As the picks pass into the receptacle 9, the follower 22 moves inwardly toward the end of the receptacle and the picks are evened up into a pile at one end thereof. As soon as the follower has reached the extreme of its inward movement, the tappet 77 engages the lever 74, swinging open the inclined side piece 14 of the receptacle 9 and the picks therein are discharged into the lower receptacle 13. As many discharges from the receptacle 9 as is desired may be made before the receptacle 13 discharges into the box, but in the machine shown eight discharges of the receptacle 9 occur to every discharge of the receptacle 13. As the picks are dropped into the receptacle 13, the follower 30 operates as does the follower 22 in the receptacle 9 to bring up the pile of picks so that they are piled up evenly at one end of the receptacle 13. When the receptacle has been filled, or substantially filled, the tappet 85 on the face of the ratchet wheel 80 will come into engagement with the pawl 86 and as previously described, will rock the shaft 87, causing the pawls 88 and 89 to operate, the inclined bottom pieces 16 and 17 of the lower receptacle 13 to be swung open thus permitting the contents of the receptacle to be dropped into the box which is placed directly beneath the said receptacle. Should there be more picks in the receptacle 13 than is required to evenly fill the box, the excess picks are brushed off by the attendant so as to leave the box even full and the box is then removed, closed and is ready for shipment.

I claim as my invention:

1. In a machine for boxing tooth picks, in combination, means for separating the picks from a mass, a chute through which the picks pass, a receptacle into which said chute discharges, means for evening up the ends of a pile of picks in said receptacle, a second receptacle into which the first mentioned receptacle discharges, means for evening up the picks in said second receptacle and means for opening both said receptacles to cause them to discharge their contents at stated times.

2. In a machine for boxing tooth picks, in combination, means for separating the picks from a mass, an inclined chute down which the picks pass and which is so shaped as to cause the picks to assume a position parallel with each other, a receptacle into which said chute discharges, means for evening up a pile of picks in said receptacle, a second receptacle into which the first mentioned receptacle discharges, means in said second receptacle for evening up the picks which are contained therein, and means for opening both said receptacles to cause them to discharge their contents at stated times.

3. In a machine for boxing tooth picks, in combination, means for separating the picks from a mass, an inclined chute down which the picks pass and which is so shaped as to cause the picks to assume a position parallel with each other, a receptacle into which said chute discharges of greater length than the picks, a follower in said receptacle and means for moving said follower in a lengthwise direction in said receptacle to engage said picks at one end thereof and move them towards the opposite end of said receptacle until the space in the receptacle which holds the picks is shortened by the follower equal to the length of the picks and thereby causes the picks to lie with even ends and means for discharging the picks from said receptacle.

4. In a machine for boxing tooth picks, in combination, means for separating the picks from a mass, an inclined chute down which the picks pass and which is so shaped as to cause the picks to assume a position parallel with each other, a receptacle into which said chute discharges of greater length than the picks, a second receptacle into which the first mentioned receptacle discharges and which is of greater length than the picks, a follower in one of said receptacles, means for moving said follower in a lengthwise direction in said receptacle to engage said picks at one end thereof and move them towards the opposite end of said receptacle until the space in the receptacle which holds the picks is shortened by the follower equal to the length of the picks and thereby causes the picks to lie with even ends and means for discharging the picks from said receptacles.

5. In a machine for boxing tooth picks and the like, in combination, means for separating the picks from a mass, an inclined chute down which the picks are caused to pass endwise, a receptacle into which said chute discharges, said receptacle being V-shaped in cross-section and said picks being delivered thereto lengthwise of the said receptacle, said receptacle being of greater length than the picks, means for pushing the mass of picks in said receptacle endwise so as to even the ends of the mass of picks therein and means for discharging said picks from the bottom of said receptacle.

6. In a machine for boxing tooth picks or the like, the combination of means for separating the picks from a mass and for causing them to assume a position parallel with each other, of two receptacles, the one discharging into the other, separate mechanisms for opening each receptacle and intermediate mechanism connected with the opening mechanism for the second receptacle which is actuated by the opening mechanism of the first receptacle, whereby the opening mechanism of the first receptacle causes the second receptacle to open after a pre-determined number of opening movements of the first receptacle.

7. In a machine for boxing tooth picks or the like having means for separating the picks from a mass, and for causing the separated picks to assume a position parallel with each other, of two receptacles, one discharging into the other, and each provided with a pivoted bottom arranged to be swung open to permit the discharge of the contents of the receptacle, separate means for swinging open the pivoted bottoms of each of said receptacles and intermediate mechanism between said two opening mechanisms whereby the mechanism for opening the first receptacle controls the opening of the second receptacle after a pre-determined number of openings of the first receptacle.

8. In a machine for boxing tooth picks having means for separating the picks from a mass and for causing the separated picks to assume a position parallel with each other, of two receptacles, one discharging into the other and each provided with pivoted bottoms arranged to be swung open to permit the discharge of the contents of the receptacle and means for swinging said bottoms, comprising a crank operated slide rod, a second slide rod operated from the first and carrying a tappet thereon, and a lever fast on the pivot of the said bottom piece and projecting into the path of the tappet whereby as the latter is moved the lever will be swung, swinging the bottom of the receptacle and permitting the discharge of the contents thereof.

9. In a machine for boxing tooth picks provided with means for operating the picks from a mass, and for causing the separated picks to assume a position parallel with each other, of two receptacles the one discharging into the other, means for opening the said receptacles to permit the discharge of the contents thereof, said means comprising a crank actuated slide rod, a second slide rod and tappet for opening the first receptacle and a pawl and ratchet, a tappet on said ratchet, a rock shaft having an arm operating with said tappet and means whereby as said rock shaft is moved the pivoted bottom portions of the said second receptacle will be swung open and the contents thereof permitted to discharge.

10. In a machine for boxing tooth picks, in combination, means for separating the picks from a mass, an inclined chute down which the picks pass, a receptacle into which the picks are discharged from said chute, a pivoted bottom for said receptacle, a slide rod, means for reciprocating said slide rod, means connecting said slide rod with the pivoted bottom of said receptacle whereby the movement of said slide rod in one direction opens said receptacle, a movable stop which is adapted to cut off the discharge of picks from said chute, and means connected with said stop and actuated by said slide rod whereby the movement of the slide rod in a direction to open the said receptacle actuates the said stop to cut off the discharge of picks from the chute.

11. In a machine for boxing tooth picks and the like, a trough-shaped receptacle having upwardly flaring sides and vertical ends, means for delivering the picks into said receptacle parallel with each other and with their axes parallel with the sides of the receptacle, one of said flaring sides of the receptacle being pivoted so as to swing outwardly from the bottom, means for turning said pivoted side on its pivot, a second receptacle beneath said first receptacle into which the picks are discharged from said first receptacle, said second receptacle having upwardly flaring sides both of which are so pivoted as to be adapted to open at the bottom, means for swinging said pivoted sides on their pivots and means for controlling the opening mechanism of said second receptacle with relation to the opening of the first receptacle whereby said first receptacle is opened a predetermined number of times for each opening movement of the second receptacle.

12. In a machine for boxing tooth picks and the like, in combination, means for separating the picks from a mass, a receptacle into which the picks are delivered, said receptacle being V-shaped in cross section and of greater length than the length of the picks, means for delivering the picks into said receptacle lengthwise thereof, a V-shaped follower which fits in the said receptacle corresponding in shape with the cross sectional contour of said receptacle, means for moving said follower to engage the picks endwise and even the ends of the pile of picks in the receptacle, and means for opening the receptacle to permit the discharge of the picks.

13. In a machine for boxing tooth picks and the like, in combination, means for separating the picks from a mass, an open-bottomed box into which said picks are delivered after being separated from the mass, said box having downwardly inclined side pieces which approach each other toward their lower edges with an open space between them at their proximate lower edges, vertical side guides parallel with each other extending downwardly from the lower edges of said inclined side pieces on opposite sides of said opening, an inclined trough-shaped chute beneath the opening between the lower edges of said vertical guides and a receptacle into which the picks are discharged from said inclined chute.

In testimony whereof I affix my signature, in presence of two witnesses.

CHARLES C. FREEMAN.

Witnesses:
WM. A. MACLEOD,
ALMIE TARR.